United States Patent
Stronger et al.

(10) Patent No.: US 10,176,338 B2
(45) Date of Patent: Jan. 8, 2019

(54) SECURE DISTRIBUTED STORAGE OF DOCUMENTS CONTAINING RESTRICTED INFORMATION, VIA THE USE OF KEYSETS

(75) Inventors: Brad A. Stronger, Mountain View, CA (US); Arijit Sengupta, San Mateo, CA (US)

(73) Assignee: salesforce.com, San Francisco, CA (US)

( * ) Notice: Subject to any disclaimer, the term of this patent is extended or adjusted under 35 U.S.C. 154(b) by 701 days.

(21) Appl. No.: 13/190,377

(22) Filed: Jul. 25, 2011

(65) Prior Publication Data
US 2012/0047553 A1    Feb. 23, 2012

Related U.S. Application Data

(63) Continuation-in-part of application No. 13/103,883, filed on May 9, 2011, which is a continuation-in-part of application No. 11/286,080, filed on Nov. 23, 2005, now Pat. No. 7,940,929.

(51) Int. Cl.
| | |
|---|---|
| G06F 17/00 | (2006.01) |
| G06F 21/62 | (2013.01) |
| G06F 21/60 | (2013.01) |
| H04L 9/08 | (2006.01) |

(52) U.S. Cl.
CPC .......... G06F 21/6245 (2013.01); G06F 21/60 (2013.01); G06F 21/6227 (2013.01); H04L 9/0894 (2013.01)

(58) Field of Classification Search
USPC ........................................................ 715/255
See application file for complete search history.

(56) References Cited

U.S. PATENT DOCUMENTS

| | | | |
|---|---|---|---|
| 5,101,493 A | 3/1992 | Travis et al. | |
| 5,181,162 A | 1/1993 | Smith et al. | |
| 5,581,682 A | 12/1996 | Anderson et al. | |
| 5,631,984 A | 5/1997 | Graf et al. | |
| 5,999,664 A * | 12/1999 | Mahoney et al. | 382/305 |
| 6,266,683 B1 | 7/2001 | Yehuda et al. | |
| 6,665,841 B1 * | 12/2003 | Mahoney et al. | 715/204 |
| 6,754,827 B1 | 6/2004 | Cane et al. | |
| 7,149,347 B1 | 12/2006 | Wnek | |
| 7,191,252 B2 * | 3/2007 | Redlich et al. | 709/246 |
| 7,272,857 B1 | 9/2007 | Everhart | |
| 7,313,825 B2 * | 12/2007 | Redlich et al. | 726/27 |
| 7,322,047 B2 * | 1/2008 | Redlich et al. | 726/27 |
| 7,418,600 B2 | 8/2008 | Dettinger et al. | |
| 7,475,061 B2 * | 1/2009 | Bargeron et al. | |
| 7,577,906 B2 | 8/2009 | Friedrichowitz et al. | |
| 7,672,999 B2 | 3/2010 | Basson et al. | |
| 7,890,405 B1 | 2/2011 | Robb | |
| 7,925,365 B2 | 4/2011 | Chua | |

(Continued)

OTHER PUBLICATIONS

PCT International Search Report and Written Opinion, PCT Application No. PCT/US12/36511, dated Jul. 10, 2012, 20 pages.

(Continued)

*Primary Examiner* — Mustafa A Amin
(74) *Attorney, Agent, or Firm* — Fenwick & West LLP

(57) ABSTRACT

A method, system and computer program product for processing documents containing restricted information. One aspect concerns storing documents in a distributed but secure manner, for example using keysets.

15 Claims, 8 Drawing Sheets

(56) References Cited

U.S. PATENT DOCUMENTS

| | | |
|---|---|---|
| 7,940,929 B1 | 5/2011 | Sengupta |
| 8,136,163 B2 | 3/2012 | Redlich et al. |
| 2002/0052901 A1* | 5/2002 | Guo et al. .................... 707/531 |
| 2002/0059539 A1 | 5/2002 | Anderson |
| 2003/0101416 A1 | 5/2003 | McInnes et al. |
| 2003/0120578 A1 | 6/2003 | Newman |
| 2003/0120949 A1* | 6/2003 | Redlich et al. ............... 713/200 |
| 2004/0193870 A1 | 9/2004 | Redlich et al. |
| 2005/0076043 A1 | 4/2005 | Benedetti et al. |
| 2005/0131805 A1 | 6/2005 | Bross |
| 2005/0132070 A1 | 6/2005 | Redlich et al. |
| 2005/0138026 A1* | 6/2005 | Liu et al. ........................ 707/5 |
| 2005/0138109 A1 | 6/2005 | Redlich et al. |
| 2005/0138110 A1 | 6/2005 | Redlich et al. |
| 2005/0165747 A1* | 7/2005 | Bargeron et al. ................. 707/3 |
| 2005/0197177 A1 | 9/2005 | Charaskika |
| 2005/0262047 A1 | 11/2005 | Wu et al. |
| 2006/0075228 A1* | 4/2006 | Black et al. .................. 713/167 |
| 2006/0130154 A1 | 6/2006 | Lam et al. |
| 2006/0190986 A1 | 8/2006 | Mont et al. |
| 2006/0200463 A1 | 9/2006 | Dettinger et al. |
| 2006/0221190 A1* | 10/2006 | Limberis et al. .......... 348/207.1 |
| 2006/0242558 A1 | 10/2006 | Racovolis et al. |
| 2007/0067242 A1 | 3/2007 | Lotspiech et al. |
| 2007/0174637 A1 | 7/2007 | Lotspiech et al. |
| 2007/0294422 A1* | 12/2007 | Zuckerman ....... G06F 17/30206 709/230 |
| 2008/0134101 A1 | 6/2008 | Newman |
| 2008/0141117 A1 | 6/2008 | King et al. |
| 2009/0070664 A1 | 3/2009 | Gavin et al. |
| 2009/0097769 A1 | 4/2009 | Velasquez et al. |
| 2010/0042841 A1 | 2/2010 | King et al. |
| 2010/0088305 A1 | 4/2010 | Fournier |

OTHER PUBLICATIONS

United States Office Action, U.S. Appl. No. 13/103,883, dated Oct. 15, 2012, 35 pages.
United States Office Action, U.S. Appl. No. 11/286,080, dated Oct. 6, 2010, 12 pages.
United States Office Action, U.S. Appl. No. 11/286,080, dated Jan. 22, 2010, 10 pages.
United States Office Action, U.S. Appl. No. 11/286,080, dated Jun. 15, 2009, 14 pages.
United States Office Action, U.S. Appl. No. 13/190,372, dated Dec. 19, 2012, 12 pages.
United States Office Action, U.S. Appl. No. 13/190,358, dated Dec. 18, 2012, 15 pages.

* cited by examiner

SECURE DISTRIBUTED STORAGE OF DOCUMENTS CONTAINING RESTRICTED INFORMATION, VIA THE USE OF KEYSETS

CROSS-REFERENCE TO RELATED APPLICATION(S)

This application is a continuation-in-part of U.S. patent application Ser. No. 13/103,883, "Shuffling Documents Containing Restricted Information," filed May 9, 2011; which is a continuation-in-part of U.S. patent application Ser. No. 11/286,080, "Method For Processing Documents Containing Restricted Information," filed Nov. 23, 2005. The subject matter of all of the foregoing is incorporated herein by reference in their entirety.

BACKGROUND

The present invention relates to the field of storing and processing documents containing restricted information. Specifically, the present invention relates to the field of protecting restricted information in a document, while storing or processing the document at a minimally secure location.

Many organizations in European Union (EU) countries and the US have started outsourcing their data-storage, processing and entry operations to other organizations, which may be located in the EU and the US or at offshore locations such as India, China, Russia and Brazil.

Outsourcing operations relating to data processing and data entry may involve the transfer of documents containing restricted information. Restricted information is defined as information that cannot be disclosed to an unauthorized organization or to an unauthorized individual. Restrictions on the disclosure of restricted information may be based on customer-specific, contract-specific or regulation-specific requirements, or in accordance with industry best practices, for example.

Restricted information includes personally identifiable information that can be used to identify an individual. Personally identifiable information is protected by various Federal and European privacy regulations, which prohibit the transfer of personal information to a foreign country. Due to these regulations, documents containing restricted information relating to an individual cannot be transferred out of the country. Hence, many organizations cannot outsource the storage or data-processing operations of documents containing restricted information. Examples of personally identifiable information include, but are not limited to, names, phone numbers, e-mail addresses, Social Security Numbers (SSNs), driving license numbers, ethnicity, religion, and combinations thereof. Restricted information may also include information such as Internet Protocol (IP) addresses that may be used to locate individuals.

Other examples of restricted information include the financial data of companies, business transaction records, medical records of individuals, and so forth. The disclosure of such restricted information may result in financial or commercial loss to a company and loss of competitive advantage.

A document may include several data fields that may individually or collectively correspond to restricted information. For instance, data fields such as a SSN or a phone number, a credit card number, and so forth, individually correspond to the restricted information. Therefore, such data fields cannot be individually disclosed to a minimally secure entity.

Further, data fields such as the name and address of an individual collectively correspond to restricted information. Therefore, such data fields cannot be collectively disclosed to a minimally secure entity. However, they can be individually disclosed to the minimally secure entity.

The minimally secure entity may be an organization or one or more individuals in an organization, who are not allowed access to the restricted information.

Various methods are available for processing documents containing restricted information. These methods are based on disguise and encryption of data fields corresponding to restricted information in documents. Disguise operations can be implemented to protect mathematical and computational data in documents. However, they cannot be widely or commonly used to protect textual data in the documents. Encryption can be used to protect textual as well as mathematical and computational data in documents. Encrypted documents can be transferred to different locations for data-processing operations. However, these documents have to be decrypted before they can be processed. A minimally secure entity, performing data processing operations has access to the decryption code(s) for decrypting encrypted documents. Therefore, methods based on encryption do not allow the transfer of documents containing restricted information to a minimally secure entity that cannot be trusted with restricted information. In addition, the methods do not provide protection for restricted information in a situation wherein the encryption fails during the transfer of documents, or in a situation wherein the minimally secure entity's infrastructure is hacked by a malicious third party.

Therefore, there is a need for approaches which allow storage and processing of maximum content in documents containing restricted information, with a minimal security risk involved during the processing of the documents. Further, there is a need for approaches to protect the restricted information from a minimally secure entity that cannot be trusted with it. There is also a need for approaches that are effective in protecting the restricted information, even if the minimally secure entity's infrastructure is hacked by a malicious third party. In addition, there is a need for approaches that can be used to incorporate and automatically enforce the information sharing restrictions on documents containing restricted information.

SUMMARY

Various embodiments and aspects of the invention can achieve certain objects, some of which are described below. Not all objects are required to be achieved by every aspect of the invention.

An object of the present invention is to provide a method for storing one or more documents containing restricted information, in part or in whole, in one or more minimally secure locations. Another object is to maintain the security of data even after one or more locations are compromised.

Another object of the present invention is to provide a method for processing one or more documents or parts of one or more documents containing restricted information, without transferring the information to a minimally secure entity in a form which includes information subject to restrictions.

Another object of the present invention is to provide a method for protecting restricted information in a document, while maximizing the subset of the document, which can be safely transferred for processing to a minimally secure entity.

A further object of the present invention is to provide a method for protecting the restricted information, while the document is being processed by a minimally secure entity, in a situation wherein the minimally secure entity's infrastructure is hacked or otherwise compromised by a malicious third party.

Another object of the present invention is to provide a method for protecting the restricted information while the document is being processed by less trusted in-house employees (for example, new or temporary employees).

Yet another object of the present invention is to provide a method that can be used to incorporate and automatically enforce the information sharing restrictions on documents containing restricted information.

Various embodiments of the present invention provide a method, system and computer program product for storing and processing documents containing restricted information. A method for storing and processing the documents includes the step of identifying the various data fields in each document.

The method also includes the step of identifying a critical section in each document. This critical section includes the minimum number of data fields corresponding to the restricted information. Further, the document is divided into a critical section and one or more non-critical sections. Thereafter, the non-critical sections are processed at the minimally secure locations.

In various embodiments of the invention, information that can be safely transferred to a minimally secure entity can be maximized by determining a maximal subset of fields, wherein (i) the fields that need to be kept together for processing are treated as one entity and kept together either in the individually critical section or in the collectively critical section or in the non-critical section, (ii) at least one field in the combination of fields, which collectively correspond to restricted information, is not included, and (iii) any field that individually corresponds to restricted information is not included. This determined maximal subset of fields represents the maximum information that can be safely transferred to a minimally secure entity. The maximal subset of fields can be further optimized by taking into consideration the relative weights assigned to each field. For example, different fields may be assigned a weight, based on the labor involved in processing each field. In this case, the maximal subset of fields represents the set of fields that does not contain restricted information and is the most labor-intensive to process. In various embodiments of the invention, different fields can be assigned a weight, based on the time, cost, and outsourcing risk involved in processing each field, and so forth. The maximal subset can be calculated using any standard constraint solving/optimizing algorithm.

The system for processing documents containing restricted information includes various modules that carry out the method of the invention in accordance with the various embodiments. A data field-identifying module identifies the different data fields in one or more documents. A critical section-identifying module identifies the critical section, which includes the minimum number of data fields corresponding to the restricted information in each document. A document-dividing module divides each document into a critical and non-critical section. A transmitting module transmits the non-critical section to a minimally secure location for processing.

Subsets of safely transferrable information can also be stored at one or more minimally secure locations. This may provide benefits commonly found with outsourced data storage, such as high availability, redundancy, transparent backup, disaster recovery, low cost, and others. In the event of an identified data security breach at one or more minimally secure locations, the data at the other locations can be quickly modified so as to render the breached data unusable for an adversary who is trying to gain access to restricted information.

In certain circumstances, it may be desirable to process or store all parts of the original document at the same minimally secure location. In an alternate embodiment of the invention, each document is split into a number of subsections where each subsection is non-critical. Then, non-critical subsections from different original documents are "shuffled" together to synthesize new documents, where no synthesized document contains a critical combination of non-critical subsections. That is, the synthesized documents are non-critical. In a simplistic implementation of this algorithm, each synthesized document could contain no more than one non-critical subsection from a given original document. Alternate implementations would allow more than one non-critical subsection from a given original document to be included in a synthesized document so long as the combination of non-critical subsections is not critical. These synthetic documents can then all be processed at the same minimally secure locations.

A system for processing documents containing restricted information includes various modules that carry out the method of the invention in accordance with the various embodiments. A data field-identifying module identifies the different data fields in one or more documents. A critical section-identifying module identifies the critical section, which includes the minimum number of data fields corresponding to the restricted information in each document. A document-dividing module divides each document into multiple non-critical sections. A shuffling module recombines non-critical sections from a set of original documents into the set of synthetic non-critical documents. A transmitting module transmits the synthesized non-critical documents to a minimally secure location for processing. A rules determination module determines and/or adjust the applicable information security rules.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DESCRIPTION OF VARIOUS EMBODIMENTS

Various embodiments of the present invention relate to the processing of one or more documents containing restricted information. Further, the embodiments of the present invention provide methods and systems for protecting restricted information in a document while the document is being processed by a minimally secure entity. Processing documents includes, but is not limited to, data entry, data transfer, data storage, data reporting, and data transformation. The minimally secure entity comprises an organization or one or more individuals in an organization, who are not allowed access to the restricted information. In an embodiment of the invention, the minimally secure location can be geographically separate from the source location of the document. For example, the source location may be in the USA, while the minimally secure location may be in India.

It is to be noted that while the examples in the description section primarily refer to document processing, the same methodologies can be applied to document storage. For example, the method of the present invention may be used in a situation where a company may want to store the maximum amount of its data at a less secure but cheaper location, while keeping the restricted information at a more secure location. According to various embodiments of the present invention a document may be a single document or a set of one or more documents that comprise restricted information.

Figure 1:
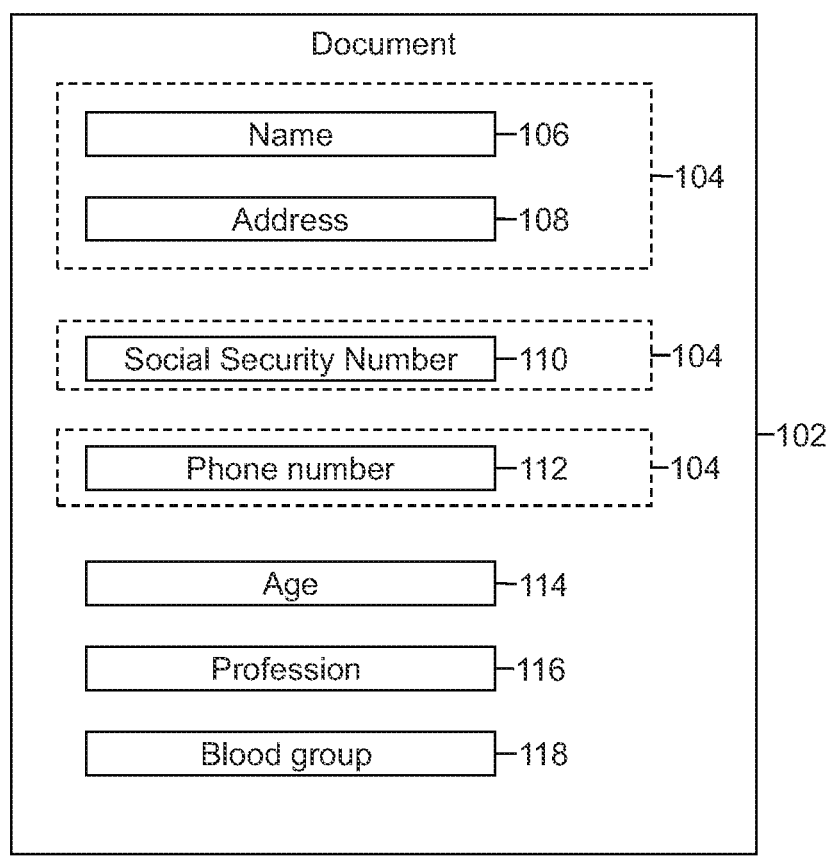
FIG. 1 is a block diagram depicting an exemplary document, in accordance with an embodiment of the present invention.

FIG. 1 is a block diagram depicting an exemplary document 102, in accordance with an embodiment of the present invention. According to various embodiments of the present invention, document 102 includes personal information relating to an individual, which may be provided by using various data fields. Examples of data fields may include name 106, address 108, Social Security Number (SSN) 110, phone number 112, age 114, profession 116, and blood group 118.

Some of the data fields in document 102 may correspond to restricted information 104. In various embodiments of the present invention, restricted information 104 includes information protected by various Federal and European privacy laws. According to these laws, restricted information cannot be transferred to a foreign location. Hence, restricted information 104 includes information that can be directly used to identify or trace an individual. For example, data fields such as SSN 110 or phone number 112 may individually correspond to restricted information 104. Data fields such as name 106 may not individually correspond to restricted information 104 in document 102. However, name 106 and address 108 may collectively correspond to restricted information 104 in document 102.

Further, some of the data fields in document 102 may correspond to non-restricted information. For example, data fields such as age 114, profession 116, and blood group 118 may correspond to non-restricted information.

Since document 102 contains data fields corresponding to restricted information 104, the document 102 should not be disclosed to the minimally secure entity. Therefore, in the current state-of-the-art technology, document 102 cannot be transferred to the minimally secure entity for processing.

Examples of restricted information may also include, but need not be limited to, information pertaining to financial data, medical records, business transactions, proprietary information (information protected by an individual or an organization to maintain confidentiality), information protected by contractual requirements, information protected by information safety requirements, and so forth.

Figure 2:
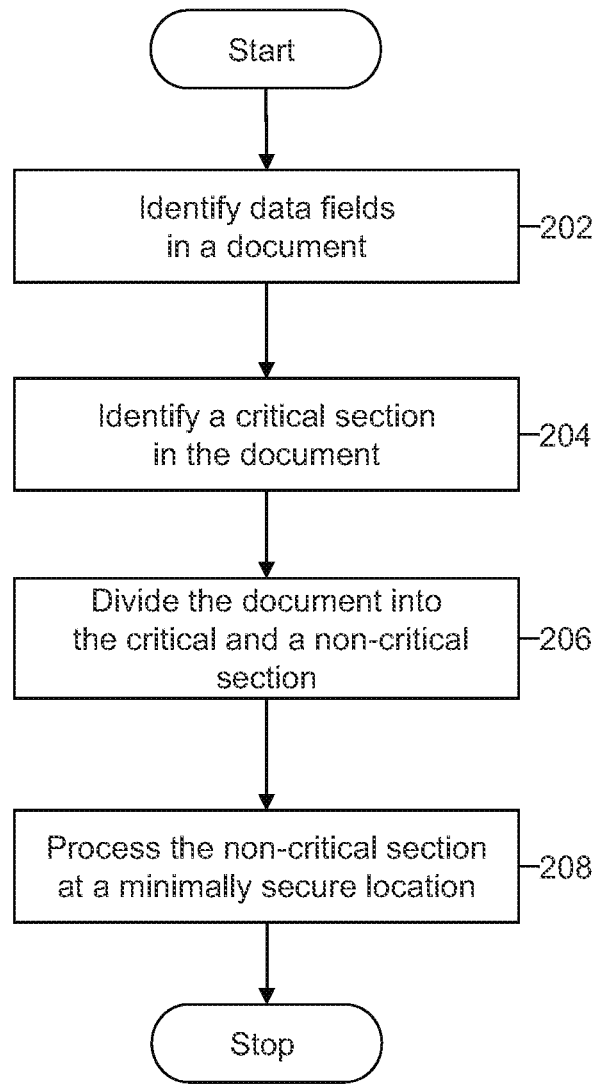
FIG. 2 is a flowchart depicting a method for processing one or more documents, in accordance with an embodiment of the present invention.

FIG. 2 is a flowchart depicting a method for processing one or more documents, in accordance with an embodiment of the present invention.

According to various embodiments of the present invention, each document may include restricted information relating to an individual. At step 202, the data fields in a document are identified. For example, referring to FIG. 1, data fields such as name 106, address 108, SSN 110, phone number 112, age 114, profession 116, and blood group 118 are identified in document 102. The data fields may be identified in several ways. For example, in an embodiment of the invention, each data field may consist of a data field name tag and a data field value tag. The data field tags may be compared to a library of equivalent tags. For example, tags named "lname" or "surname" may be mapped to a normative tag "last name." In other embodiments of the invention, specific values assigned to tags may also be considered. For example, if a tag is named "g" but the only values observed for the tag are "male" and "female", then the tag "g" may be mapped to a normative tag "gender". In various embodiments of the invention, a user may manually map the user specific tags to the normative tags. More advanced techniques arising out of the data integration domain may also be used to achieve the same result. Additional automated data mapping techniques are described in U.S. patent application Ser. No. 13/080,599, "Automatically Generating Data Transformations for Business Process Platforms," which is incorporated herein by reference in its entirety.

Thereafter, at step 204, a critical section in document 102 is identified. According to various embodiments, the critical section includes the minimum subset of data fields corresponding to restricted information 104. For example, referring to FIG. 1, SSN 110 and phone number 112 individually correspond to restricted information 104. Similarly, name 106 and address 108 collectively correspond to restricted information 104. Therefore, the critical section of document 102 may include one or more data fields, such as name 106 and address 108, SSN 110 and phone number 112. The critical section in document 102 is identified using a method for maximizing the information that can be safely transferred to a minimally secure entity for processing. The method is based on certain rules that may be defined by a user and/or built-in rules based on appropriate regulations, and industry best practices. This method is further elaborated on in FIG. 6.

At step 206, document 102 is divided into a critical section and a non-critical section. The non-critical section includes data fields that correspond to non-restricted information. For example, referring to FIG. 1, age 114, profession 116, and blood group 118 correspond to non-restricted information. Therefore, the non-critical section of document 102 may include one or more data fields such as age 114, profession 116, and blood group 118.

In various embodiments of the invention, certain data fields have to be kept together for processing. Such data fields are kept together in either the critical section or the non-critical section. For example, in a data processing operation where the taxable income of individuals has to be computed, the fields that relate to the different sources of an individual's income need to be kept together for processing. However, one or more of such data fields may correspond to restricted information. Therefore the set of data fields that relate to the different sources of an individual's income are treated as one segment or one entity and are included in the same critical section.

In an embodiment, document 102 is divided into a critical section and a non-critical section, using an appropriate computational algorithm selected from the group of graphical manipulation algorithms, text manipulation algorithms, audio manipulation algorithms and any other computational algorithm that is compatible with the format of the document. For example, the document may comprise audio signals, electromagnetic signals and so forth. Accordingly, the appropriate computational algorithm for dividing such documents may be an algorithm that can manipulate audio signals, electromagnetic signals and so forth.

Different computational tools are available for automatic manipulation of information stored as text or images. For example, direct digitization of textual documents can be carried out by using a mark-up language such as the Standard Generalized Mark-up Language (SGML). SGML documents have a consistency that facilitates automated manipulation of scanned documents, and they can be reused in different applications (such as paper publishing, databases, etc.) by using tools based on pattern recognition and rule-based manipulation. Thereby, scanned documents can be manipulated to remove fields containing restricted information.

Further, the data can be stored in the databases and retrieved by using structured query language (SQL). Moreover, integrations can be automated by using batch files, scripts, and SQL stored procedures. The data can be stored in a structured format, and only the required information can be retrieved, without the original stored data being affected. Consequently, non-critical information can be selectively retrieved from scanned documents.

Manipulation of information stored as images is enabled with various software applications such as Adobe Photoshop 7™, Auto Imager™, etc. In other embodiments of the invention, computational tools that are capable of masking certain information in a document can also be used. For example, in a document comprising an X-ray picture and a corresponding data-label, the data-label may comprise fields such as a person's name, SSN, address, birth-date and so forth. In such documents, the critical section comprises fields that correspond to restricted information such as the person's SSN and address. The non-critical section of such documents may comprise the X-ray image and fields, such as name and birth-date in the data label. The critical section of such document may be masked using computational tools for image manipulation. In such embodiments, documents with masked critical sections are provided to the minimally secure entity for data processing operations such as X-ray interpretation In various embodiments, a software code can be used for optical masking of the document. The masking algorithm can be used to mask the critical sections. The software code for optical masking of documents may be based on a pre-defined template document. The software code compares the document(s) to be masked with the template document, to confirm the orientation and size of the document to be masked. The software code may then apply different techniques to identify critical fields and conduct masking operations on the fields of the documents. An example of such a technique may be the field identification technique that is a part of the Optical Character Recognition (OCR) technique.

In an embodiment of the present invention, the different fields to be masked are predefined, based on the template document. For example, in the template document, the data field SSN 110 may appear on the upper left corner. If SSN 110 is a critical field, the software code will mask the corresponding upper left corner of all the documents (after considering zooming and orientation) that are to be transferred to a minimally secure entity for processing. The masking activity may be carried out in various ways, such as drawing a black rectangle over the area corresponding to a critical field.

Various embodiments of the present invention allow software systems to incorporate and automatically enforce pre-defined information sharing restrictions. The information-sharing restrictions may be pre-defined by competent authorities. For example, software systems can be tailored to identify the critical section of documents comprising fields that correspond to restricted information according to privacy regulations. Such software systems can be used to automatically enforce the information sharing restrictions on any document. This eliminates the need for user(s) of such software systems to analyze and interpret the specifications of privacy regulations. Further, this ensures that the privacy regulations are not applied differently to different documents based on different interpretations by users.

At step 208, the non-critical section is processed by a minimally secure entity. The minimally secure entity may be an organization or individuals in an organization who are not allowed access to restricted information 104. For example, the minimally secure entity may be a data-processing organization, which performs data processing operations on document 102. The organization may be situated at a minimally secure location, which may be a foreign country that is not allowed access to restricted information 104. The minimally secure entity may be a data-processing organization, which is not located in a foreign country but is still not allowed access to restricted information. The minimally secure entity may also be a group of data-processing operators in the (source) organization, who are not allowed access to restricted information 104. The minimally secure entity may also be a resource such as a minimally secure server in which restricted information cannot be stored for security reasons.

The critical section may be recombined with the non-critical section that has been processed at the minimally secure location.

In an embodiment, the critical and non-critical sections are assigned a unique section identifier code. For example, the critical section of document 102 may be assigned a section identifier code X1, and the non-critical section a section identifier code X2. In various embodiments of the invention, the unique section-identifier code is maintained during the processing of the sections, to enable their identification after processing.

The recombining of the critical and non-critical sections is based on the unique section identifier code assigned to them. For example, the critical section of document 102 that was assigned a section identifier code X1 may be recombined with the non-critical section of document 102 that was assigned a section identifier code X2, after the non-critical section has been processed at the minimally secure location.

An example of recombining information after such processing may include activities such as claim adjudication. For example, a claim may contain (a) identity information such as first name, last name and an identity number such as Social Security Number, (b) medical information such as existing medical conditions, symptoms, diagnoses, and treatments, and (c) financial information such as fees, co-payment rules and insurance payouts for the specific patient till date. The identity information may be kept confidential by the client (i.e., highest level of security) and the medical information can be provided to an offshore provider (i.e., minimally secure location) for processing, whereas the financial information can be processed by an onshore provider (i.e., more secure location) if the relevant regulations so require. After the offshore provider confirms that the treatments were appropriate given the other medical information, and the onshore provider calculates the appropriate payment amount based on the financial information, the client can combine the two pieces of processed information and use them to process the claim.

Mapping information relating to the assignment of the unique identifier codes to the critical and non-critical sections is stored securely at the source organization. This ensures that a minimally secure entity cannot recombine the critical and non-critical sections to obtain restricted information 104.

Figure 3:
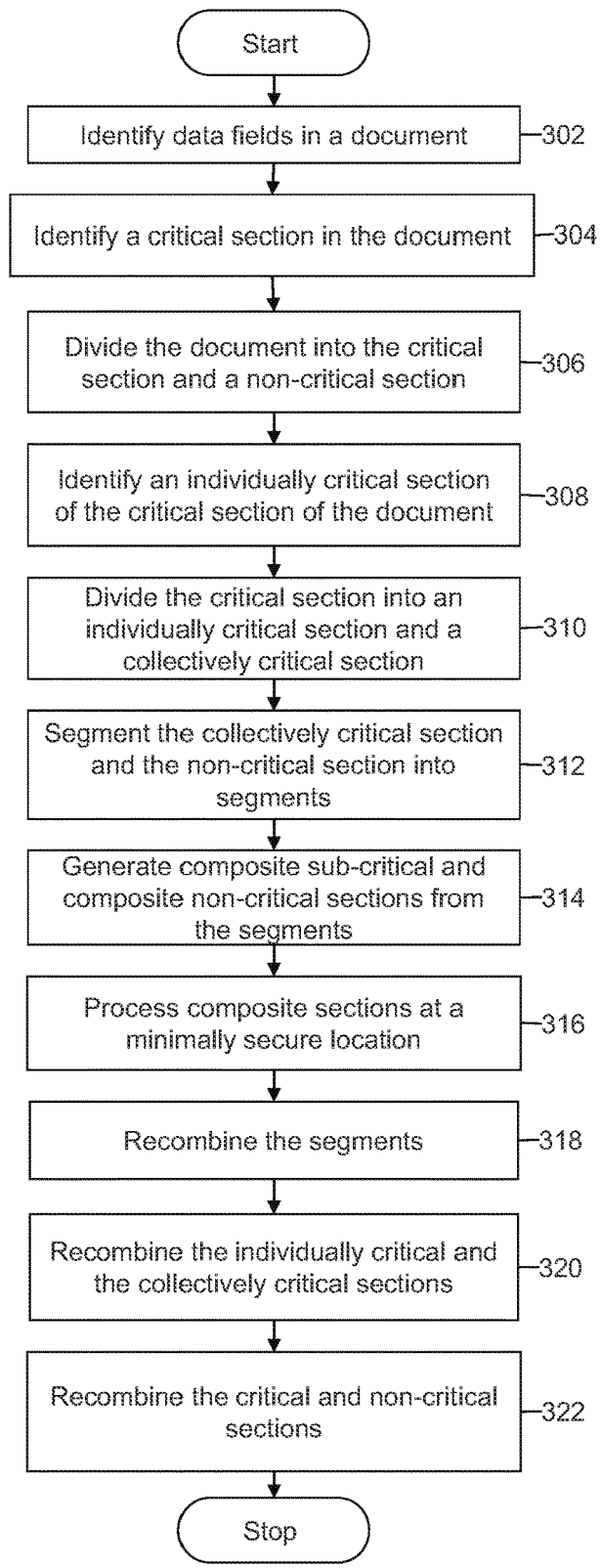
FIG. 3 is a flowchart depicting a method for processing one or more documents, in accordance with another embodiment of the present invention.

FIG. 3 is a flowchart depicting a method for processing one or more documents, in accordance with another embodiment of the present invention. At step 302, the data fields in a document 102 are identified. For example, referring to FIG. 1, data fields such as name 106, address 108, SSN 110, phone number 112, age 114, profession 116, and blood group 118 are identified in document 102 as described in step 202 of FIG. 2.

Figure 6:
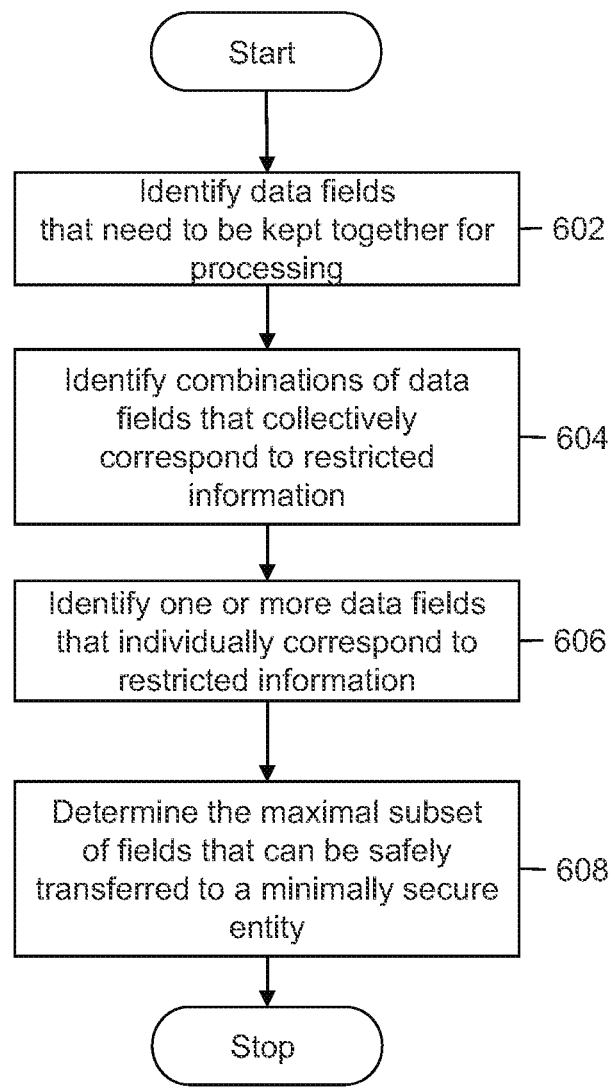
FIG. 6 is a flowchart depicting a method for maximizing the information that can be safely transferred to a minimally secure entity for processing, in accordance with various embodiments of the invention.

Thereafter, at step 304, a critical section in document 102 is identified as described in step 204 of FIG. 2 and further elaborated on in the method described in FIG. 6. According to various embodiments, the critical section includes the data fields that correspond to the restricted information 104. The critical section is created in such a manner that it includes the minimum subset of fields that correspond to restricted information.

At step 306, document 102 is divided into a critical section and a non-critical section. The non-critical section includes data fields that correspond to non-restricted information.

In an embodiment, document 102 is divided into a critical section and a non-critical section, using a computational algorithm selected from a group of graphical manipulation and text manipulation algorithms.

According to various embodiments of the present invention, the critical section and the non-critical section are assigned a unique section identifier code.

At step 308, an individually critical section within the critical section of document 102 is identified. According to various embodiments, the individually critical section includes the data fields that individually correspond to restricted information. For example, referring to FIG. 1, the individually critical section of document 102 includes data fields such as SSN 110 and phone number 112. In an embodiment of the invention, the data fields that need to be kept together for processing are treated as one segment or one entity. If one or more of these fields individually correspond to restricted information, or these fields collectively correspond to restricted information, then the fields that need to be kept together for processing are treated as one entity and included in the individually critical section. The individually critical section cannot be disclosed to a minimally secure entity.

At step 310, the critical section of document 102 is divided into an individually critical section and a collectively critical section. The collectively critical section comprises data fields that collectively correspond to restricted information. For example, the collectively critical section of document 102 includes data fields such as name 106 and address 108. The collectively critical section cannot be disclosed to a minimally secure entity unless at least one of the fields included in the collectively critical section is removed.

According to various embodiments of the present invention, a unique critical section identifier code may be assigned to the individually critical and collectively critical sections of document 102. For example, referring to FIG. 1, the individually critical section of a first document 102 is assigned a critical section identifier code K1, and the collectively critical section is assigned a critical section identifier code K2. Similarly, for a second document 102, the individually critical section is assigned a critical section identifier code P1, and the collectively critical section is assigned a critical section identifier code P2.

The unique critical section-identifier code is maintained during the processing of the sections, to enable their identification after processing.

At step 312, the collectively critical section is segmented into one or more sub-critical segments. Each sub-critical segment includes at least one instance of a data field from a set of fields that collectively correspond to the restricted information and never includes all of the fields of a set of fields that collectively correspond to restricted information. For example, referring to FIG. 1, in the collectively critical section of document 102, name 106 and address 108 collectively correspond to restricted information. The collectively critical section of document 102 may be segmented into a sub-critical segment that includes name 106, another sub-critical segment that includes address 108, and so forth. In an embodiment of the invention, the segmenting can be carried out by copying the section of the document that corresponds to name 106 into a new file and masking the area corresponding to name 106 with a black rectangle. The collectively critical sections of other such documents 102 may be segmented in the same way.

The data being split may be subject to a complex set of regulations. In some cases, the determination of whether a field is individually critical or whether a set of fields is collectively critical, may depend on the actual data in that field. In such cases, a procedure can be created which determines whether the data in that field(s) for a particular document must be treated as critical or not in order to comply with regulations.

One example is regulations governing "Personally Identifiable Information." A last name of "Smith" would probably not be considered personally identifiable. However, a very rare last name may be considered personally identifiable. In this case, the software could consult a list of common names in order to make the determination whether a specific last name was critical. Alternately, it could search through a customer records database for frequent occurrences of this name. It may also query an Internet database to see how common the name is. Because the Internet query happens with just the name itself and without any context for the query, such an activity itself would usually not be considered a disclosure. For a field like "Address Line 1," the software could search using mapping software to see how many cities have such an address.

In documents subject to these or similar regulations, "free form" fields such as a comments field may exist. These fields may be designated as possibly containing critical information. For example, an operator may type critical Social Security Number into the comments field to expedite processing of a claim. In such cases where a free form field is designated as possibly critical, the software may attempt to use regular expressions or other pattern matching methods to determine what type of critical data might be in the free form field. For example, data containing a string of nine numeric characters may be identified as a potential Social Security Number. These expressions and data patterns may be determined a priori. Alternately, they may be learned. For example, a learning algorithm might analyze data from fields that are known to be critical and learn data patterns from such an analysis. Alternately, each of the search algorithms identified for other possibly critical fields (name, address, etc) can be applied to the possibly critical free form field to detect possibly critical data.

The same algorithms that are used to determine the type of data in the free form field can also be applied to data in other fields. Using this method, the software may be able to identify instances where data was placed in the wrong field (for example an operator typing critical data into a non-critical field because he accidentally typed the data into an adjacent field). By analyzing the type of data as well as the proximity of the fields, the document can be flagged or automatically corrected.

Another example is regulations which specify that personal information may not be shared if the information is not publicly available. For a field such as phone number, the software could search a public phone listing to determine if the data is permitted to be stored in a minimally secure location.

The same methods can be used for possibly collectively critical sets of fields. For example, the combination of First Name and Last Name may be collectively critical only if it identifies a person. While the person may have a common first name and a common last name, the combination may be rare or unique. To make the decision, the software could use any method, including those discussed for potentially individual critical fields, to determine how common that particular name combination is. In an embodiment of the invention, the data fields that need to be kept together for processing are treated as one segment or one entity and are included in the same sub-critical segment.

In an embodiment, the non-critical section may also be segmented in the same way as the collectively critical section.

In an embodiment, the individually critical section may also be segmented in the same way as the collectively critical section. This may use textual, image or signal manipulation within a field. For example, the SSN field may be individually critical, but the SSN may be split into three parts, each of which is sub-critical by itself. In cases where parts of the individually critical fields are always the same in a given context (for example, if all the SSNs are from the same city and thus a portion of every SSN is identical) then it is desirable for the variable portion of the individually critical field to be split.

According to various embodiments of the present invention, a unique segment identifier code may be assigned to each sub-critical and non-critical segment. For example, referring to FIG. 1, for document 102, the sub-critical segment that includes name 106 is assigned a segment identifier code A1, and the sub-critical segment that includes address 108 is assigned a segment identifier code A2. Similarly, for another document 102, the sub-critical segment that includes name 106 is assigned a segment identifier code B1, and the sub-critical segment that includes address 108 is assigned a segment identifier code B2.

At step 314, composite sub-critical sections that include sub-critical segments from different documents, are generated. The composite sub-critical sections are generated in such a way that no more than one sub critical segment from the same collectively critical subset of fields is included in the same composite sub-critical section. For example, the sub-critical segment that includes name 106 is included in a first composite sub-critical section. Similarly, the sub-critical segment that includes address 108 is included in a second composite sub-critical section. Thereby, it is ensured that name 106 and address 108, which collectively correspond to restricted information 104 from a given document 102, are not included in the same composite sub-critical section.

In an embodiment of the invention, certain data fields may need to be kept together for processing. The data fields that need to be kept together for processing are treated as one segment or one entity and are included in the same section and the same composite section.

In another embodiment, composite non-critical sections comprising non-critical segments from different documents are generated in the same way that the composite sub-critical sections are generated.

At step 316, a minimally secure entity at a minimally secure location processes the composite sub-critical sections. In an embodiment, the composite non-critical sections are also processed by a minimally secure entity. The unique segment-identifier code is maintained during the processing of the composite sections, to enable identification of segments within composite sections after processing.

In various embodiments of the invention, composite sub-critical sections, or even composite non-critical sections, may be further divided into subsets before they are processed at step 312. The method for dividing the composite sub-critical section is elaborated on in conjunction with FIG. 4. The division of composite sections (composite sub-critical sections and the composite non-critical sections) into further subsets ensures additional protection for restricted information 104.

At step 318, the sub-critical segments in the composite sub-critical sections are recombined after they have been processed at the minimally secure location. The process of recombining the sub-critical segments is based on the unique segment identifier code assigned to each sub-critical segment. For example, the sub-critical segment that had been assigned the segment identifier code A1 is recombined with the sub-critical segment that had been assigned the segment identifier code A2, to regenerate the collectively critical section of a first document 102. Similarly, the sub-critical segment that had been assigned the segment identifier code B1 is recombined with the sub-critical segment that had been assigned the segment identifier code B2, to regenerate the collectively critical section of a second document 102, and so forth. Information relating to the assignment of the unique identifier codes to sub-critical and non-critical segments is stored securely at the source organization. This ensures that a minimally secure entity cannot recombine the sub-critical segments to obtain restricted information 104.

In an alternate embodiment, the non-critical segments may also be recombined after they are processed at a minimally secure location, to regenerate non-critical sections in the same way as sub-critical segments are recombined to generate collectively critical sections.

At step 320, the individually critical section and the corresponding collectively critical section are recombined after the collectively critical section has been processed at the minimally secure location. The process of recombining the individually critical and the collectively critical sections is based on the unique critical section identifier code assigned to each section. For example, the collectively critical section that had been assigned the section identifier code K1 is recombined with the individually critical section that had been assigned the section identifier code K2 to regenerate the critical section of document 102.

Information pertaining to the assignment of the unique identifier codes to collectively critical and individually critical sections is stored securely at the source organization. This ensures that a minimally secure entity cannot recombine the collectively critical and the individually critical sections to obtain restricted information.

At step 322, the critical section of document 102 is recombined with the non-critical section to generate the document 102. The process of recombining the critical and non-critical sections is based on the unique section identifier codes assigned to the sections.

Information pertaining to the assignment of the unique identifier codes to critical and non-critical sections is stored securely at the source organization.

Figure 4:
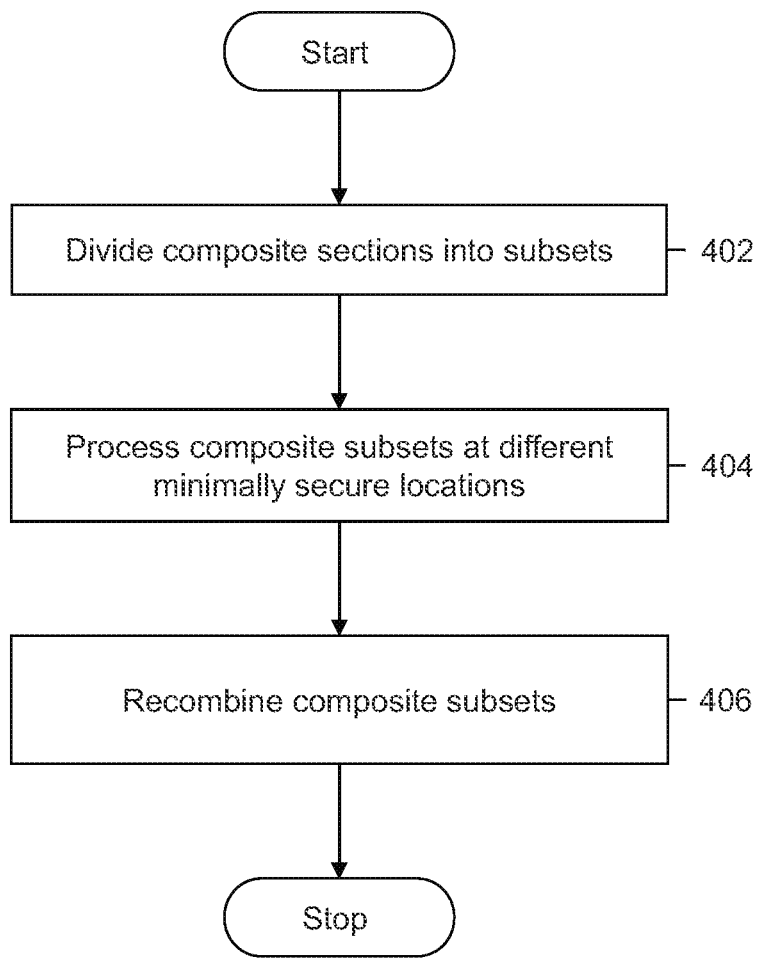
FIG. 4 is a flowchart depicting a method for dividing the composite sections of one or more documents, in accordance with an embodiment of the present invention.

FIG. 4 is a flowchart depicting a method for dividing the composite sections of documents into one or more subsets, in accordance with an embodiment of the present invention. This may be applicable in a situation where a company does not wish a minimally secure entity to have access to even non-restricted information in its totality.

At step 402, the composite sections of documents are further divided into one or more subsets. For example, in a situation where a company requires outsourcing of its bookkeeping operations, documents containing information relating to the identity of the company's customers and the company's financial transactions may be transferred to a minimally secure entity for processing. The documents may be divided into a critical section and a non-critical section. The critical section may be further divided into an individually critical section and a collectively critical section. The individually critical section of the documents, comprising fields that relate to restricted information (such as the identity of the company's customers) may not be transferred to the minimally secure entity for processing. The non-critical sections of the documents, comprising fields that relate to non-critical information (such as revenues and expenses relating to financial transactions) may be further segmented into non-critical segments, such that each non-critical segment contains information (revenues and expenses) relating to a single transaction. Composite non-critical sections comprising non-critical segments from different documents may be generated. These composite non-critical sections may be transferred to the minimally secure entity for processing. However, the company may not wish to provide the minimally secure entity access to information that can be used by the minimally secure entity to calculate the financial standing (such as the net profit) of the company. Information contained in the composite non-critical sections may be used by the minimally secure entity to calculate the net profit of the company.

Therefore, the composite non-critical sections of documents are further divided into subsets and sent to different minimally secure entities for processing. This ensures that a single minimally secure entity does not have access to all composite non-critical sections, to calculate the net profit of the company. The composite non-critical sections may be divided into composite non-critical subsets in various ways. For example, a composite non-critical section that contains the details of the revenues and expenses of random transactions may be divided into two subsets. The first subset may contain the fields that relate to the revenues and expenses of odd numbered transactions, while the second subset may contain the fields that relate to the revenues and expenses of even numbered transactions. Both of the composite non-critical subsets may be transferred to different minimally secure entities for processing. Therefore, a single minimally secure entity does not have access to the information that can be used to calculate the net profit of the company. However, this still allows a single minimally secure entity access to all the information that can be used to approximate the average profitability of the company.

In an alternate embodiment, each composite non-critical subset that contains the details of the revenues and expenses for random transactions may be further divided. The first subdivision of a composite non-critical subset may contain the fields that relate to the revenues of random transactions, while the second subdivision of a composite non-critical subset may contain the fields that relate to the expenses of the random transactions. Both the subdivisions may be transferred to different minimally secure entities for processing. This ensures that a single minimally secure entity does not have access to information that can be used to calculate the net profit, or even the average profitability, of the company. In an embodiment, the composite collectively critical subsets may be divided into subsets in the same way that non-critical subsets are divided.

According to various embodiments of the present invention, the composite subsets may be assigned unique subset identifier codes. For example, a composite non-critical section K may be divided into two subsets. The first composite non-critical subset may be assigned the subset identifier code K1 and the second composite non-critical subset may be assigned the subset identifier code K2. Thereafter, at step 404, the composite non-critical subsets are processed at different minimally secure locations. For example, the composite non-critical subset, which was assigned a subset identifier code K1, may be processed at a first minimally secure location, and the second composite non-critical subset, which was assigned a subset identifier code K2, may be processed at a second minimally secure location.

In an embodiment, the composite sub-critical subsets may be processed at different minimally secure locations in the same way that non-critical subsets are processed.

The subset-identifier code is maintained during the processing of the subsets, to enable identification of subsets after processing.

At step 406, the composite non-critical subsets may be recombined after they are processed at different minimally secure locations. The recombining procedure may be based on the unique subset identifier codes assigned to each subset. For example, the first composite non-critical subset, which was assigned a subset identifier code K1, may be recombined with the second composite non-critical subset, which was assigned a subset identifier code K2, to regenerate the composite non-critical section K.

In an embodiment, the composite sub-critical subsets may also be recombined after they are processed at different minimally secure locations, to regenerate the composite sub-critical section.

Information relating to the assignment of the unique identifier codes to the composite sub-critical and non-critical subsets is stored confidentially at the source organization. This ensures that a minimally secure entity cannot recreate the original data by recombining the composite sub-critical subsets and the non-critical subsets even if it collaborates with another minimally secure entity. Further, the source organization may not transfer one or more composite subsets to any of the minimally secure entities. Such one or more composite subsets may be processed in-house by the source organization. This eliminates the possibility of recreating certain restricted information (such as the total revenues and total expenses of the company in the example above) even if all of the minimally secure entities collaborate among themselves.

The various embodiments of the present invention can be implemented by a system that comprises various modules to carry out the method steps of the present invention.

Figure 5A:
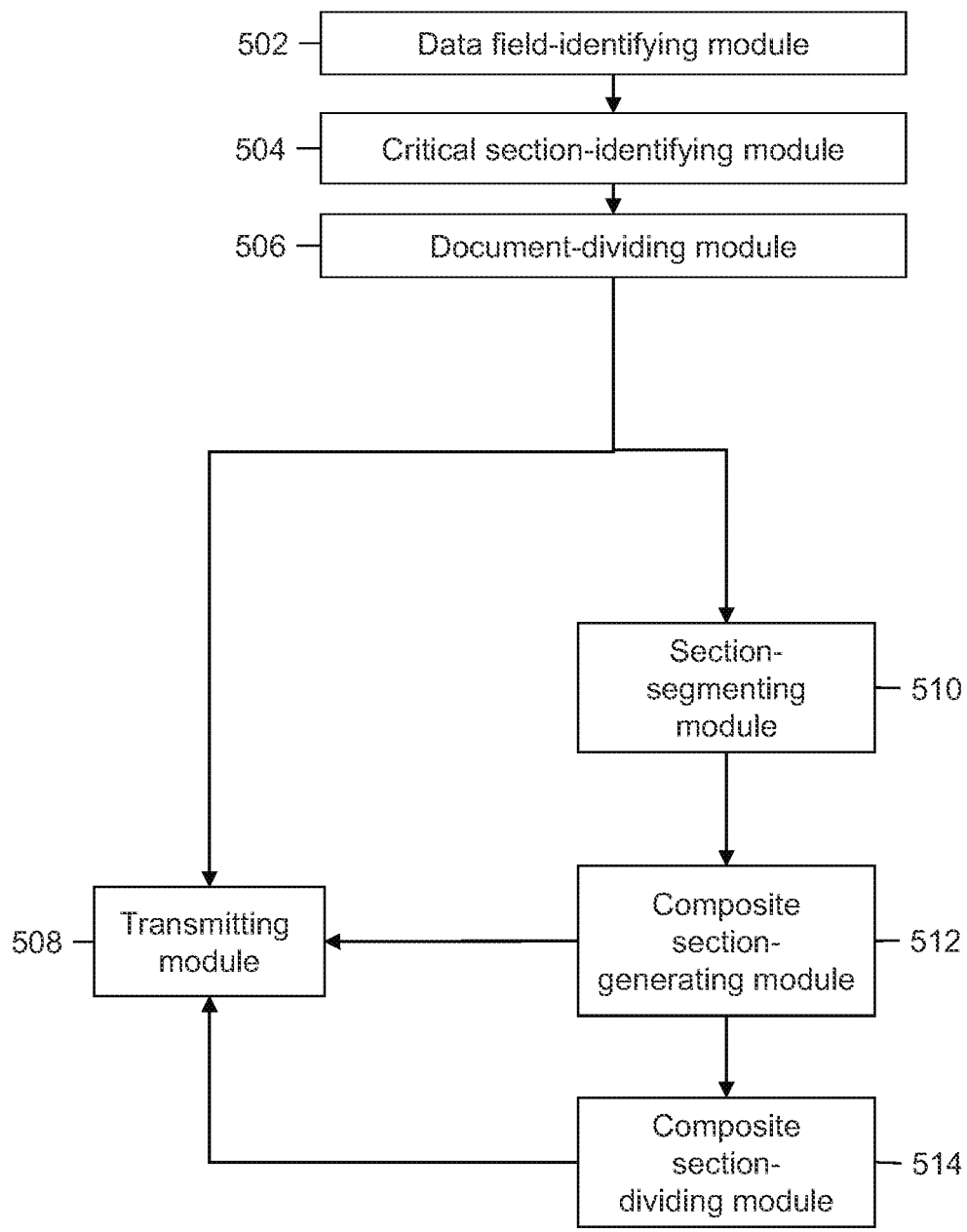
FIGS. 5A, 5B, 5C and 5D represent block diagrams illustrating a system for processing one or more documents, in accordance with an embodiment of the present invention.

FIG. 5A represents a block diagram illustrating a system for processing one or more documents, in accordance with an embodiment of the present invention.

According to various embodiments of the invention, the system includes a data field-identifying module 502, which identifies the various data fields in a document. For example, referring to FIG. 1, data field-identifying module 502 identifies name 106, address 108, Social Security Number (SSN) 110, phone number 112, age 114, profession 116, and blood group 118 in document 102 using the method described in step 202 of FIG. 2.

Based on the data fields identified by data field-identifying module 502, a critical section-identifying module 504 identifies a critical section and a non-critical section in the document using the method described in step 204 of FIG. 2 and further elaborated on in the method described in FIG. 6. The non-critical section includes the maximum subset of data fields that correspond to non-restricted information. The critical section includes the minimum subset of data fields that correspond to restricted information 104 in the document 102. For example, critical section-identifying module 504 identifies a critical section for document 102, which includes one or more data fields such as name 106 and address 108, SSN 110 and phone number 112. The section-identifying module 504 also identifies a non-critical section for document 102, which includes phone number 112, age 114, profession 116, and blood group 118 in document 102. In an embodiment of the invention, the critical sections are identified such that the maximum number of data fields can be processed with a minimal security risk involved during the processing of document 102. An exemplary method for maximizing the information that can be safely transferred to a minimally secure entity for processing, in accordance with various embodiments of the invention is described in conjunction with FIG. 6. The critical section-identifying module further identifies an individually critical section of each critical section comprising data fields that individually correspond to restricted information.

Thereafter, a document-dividing module 506 divides the document into a critical section and a non-critical section. The document-dividing module 506 further divides the critical section into an individually critical section and a collectively critical section. Further, a transmitting module 508 transmits the non-critical section to a minimally secure location for processing.

According to various embodiments of the present invention, a section-segmenting module 510 segments the collectively critical section into one or more sub-critical segments. Each sub-critical segment contains at least one instance of a data field corresponding to restricted information and never includes all of the fields of a set of fields that collectively correspond to restricted information. Section-segmenting module 510 also segments the non-critical section into one or more non-critical segments. Each non-critical segment contains at least one instance of a data field corresponding to non-restricted information.

Thereafter, a composite section-generating module 512 generates composite sub-critical sections by randomly recombining sub-critical segments from different documents. The composite sub-critical sections are generated in such a way that no more than one sub critical segment from the same collectively critical subset of fields is included in the same composite sub-critical section. Composite section-generating module 512 can further generate composite non-critical sections by randomly recombining non-critical segments from different documents. Each composite non-critical section comprises one or more instances of a non-critical segment from a given document.

Composite section-generating module 512 is connected to transmitting module 508, which transmits the composite sub-critical section and the composite non-critical section to the minimally secure location for processing.

According to various embodiments of the present invention, composite section-generating module 512 is further connected to a composite section-dividing module 514, which divides the composite sub-critical section into at least two subsets. Composite section-dividing module 514 can also divide the composite non-critical section into at least two subsets.

Thereafter, transmitting module 508 transmits the composite sub-critical subsets and composite non-critical subsets to different minimally secure locations for processing.

Figure 5B:
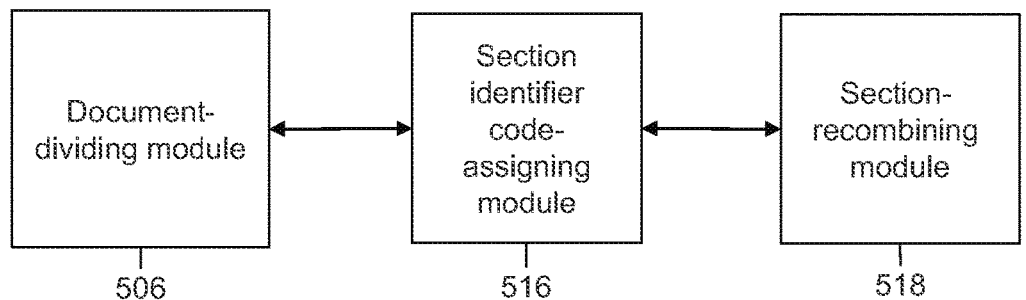

FIG. 5B represents a block diagram illustrating a system for processing one or more documents, in accordance with an embodiment of the present invention.

According to various embodiments of the present invention, document-dividing module 506 is connected to a section identifier code-assigning module 516, which assigns a unique section identifier code to the critical section and a unique section identifier code to the non-critical sections of document 102. Section identifier code assigning module 516 further assigns a unique critical section identifier code to the individually critical and a unique section identifier code to the collectively critical section. The unique section identifier code assigned by the section identifier code-assigning module is maintained during the processing of the sections. Section identifier code-assigning module 516 is further connected to a section-recombining module 518. Section identifier code-assigning module 516 provides information pertaining to the unique section identifier codes to section-recombining module 518. Section-recombining module 518 recombines the individually critical sections and the collectively critical sections to regenerate the critical section of document 102. The section-recombining module 518 further recombines the critical section and the non-critical section after they are processed by the minimally secure entity, to regenerate document 102.

Figure 5C:
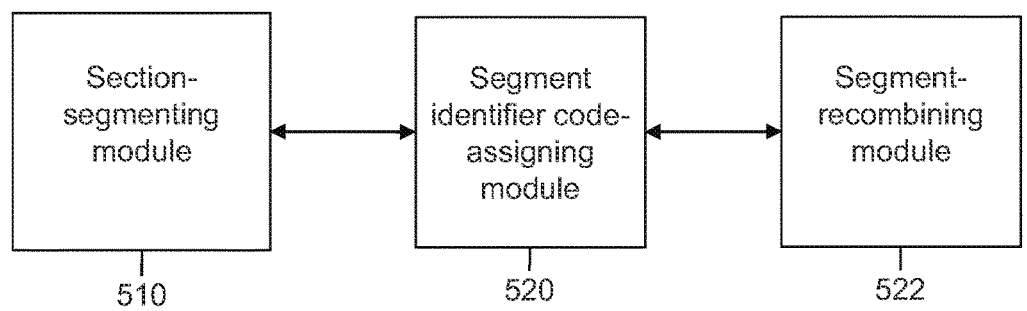

FIG. 5C represents a block diagram illustrating a system for processing one or more documents, in accordance with an embodiment of the present invention.

According to various embodiments of the present invention, section-segmenting module 510 is connected to a segment identifier code-assigning module 520, which assigns a unique segment identifier code to each sub-critical and each non-critical segment of document 102. The unique segment identifier code assigned by the segment identifier code-assigning module is maintained during the processing of the segments. Segment identifier code-assigning module 520 is further connected to a segment-recombining module 522. Segment identifier code-assigning module 520 provides information pertaining to the segment-identifier codes to the segment-recombining module 522. Segment-recombining module 522 recombines the sub-critical and non-critical segments after they are processed by the minimally secure entity, to regenerate the collectively critical and non-critical sections respectively.

Figure 5D:
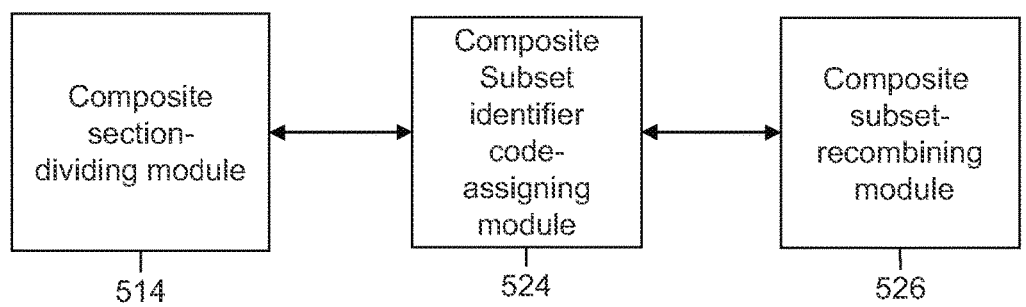

FIG. 5D represents a block diagram illustrating a system for processing one or more documents, in accordance with an embodiment of the present invention.

According to various embodiments of the present invention, composite section-dividing module 514 is connected to a composite subset identifier code-assigning module 524, which assigns a unique composite subset identifier code to each subset of the sub-critical and non-critical composite sections. The unique composite subset identifier codes assigned by the composite subset identifier code-assigning module are maintained during the processing of the subsets of the sub-critical and non-critical composite sections. Composite subset identifier code-assigning module 524 is further connected to a composite subset-recombining module 526. Composite subset identifier code-assigning module 524 provides information pertaining to unique composite subset identifier codes to a composite subset-recombining module 526. Composite subset-recombining module 526 recombines the composite sub-critical and non-critical subsets after they have been processed by different minimally secure entities, to regenerate the composite critical and non-critical sections.

FIG. 6 is a flowchart depicting a method for maximizing the information that can be safely transferred to a minimally secure entity for processing, in accordance with various embodiments of the invention. The method for maximizing the information that can be safely transferred to a minimally secure entity for processing may be based on certain rules that may be defined by a user and/or built-in rules based on appropriate regulations, and industry best practices. The built-in rules describe constraints based on normative tags, while the user defined rules may describe constraints based on user specific tags or normative tags. As described in step 202, the rules based on either normative tags or user specific tags may be treated as equivalent. The built-in rules may be specific to the industry, country, etc. The algorithm used for implementing the method may automatically apply only the built-in rules that are appropriate to the user based on industry and location data specified by the user.

In various embodiments of the invention, the following two major types of rules may be applied in the method for maximizing the information that can be safely transferred to a minimally secure entity for processing:

(i) Atomicity rules: These relate to data fields that need to be kept together for processing. The atomicity rules may be specified by a user based on unique business needs. For example, a user may specify that the fields such as 'name' and 'gender' may need to be kept together for processing. In another example, certain built-in rules may be based on industry best practices. For example, a default built-in rule may specify that the fields such as "category_id" and "product_id" should always be kept together for processing. In various embodiments of the invention, a manual or an automated evaluation of the appropriate process description or workflow may lead to the identification of such atomicity rules. For example, if a process calculates the sum of two numbers, then the corresponding fields relating to the two numbers may be kept together for processing. In certain circumstances an operator may typically look up certain information before processing the transaction. For example, to process a claim, a claim adjuster may need to know the amount already paid out in claims to the current customer in the current calendar year. Such looked up information may be accessed and included among the fields that are kept together for processing in the transaction. In a possible embodiment, if the only reason certain critical fields such as SSN were included in the transaction was to facilitate such lookup, then these critical fields could be removed from the transaction once the looked up fields are included in the transaction to be processed.

(ii) Information security rules: These relate to data fields that correspond to restricted information: The information security rules may be specified by a user based on unique business needs. For example, a user may specify that fields such as 'taxable income' correspond to restricted information. In another example, certain default built-in rules may also be provided based on relevant regulations or industry best practices. For example, a built-in rule may specify that the field "social security number" may correspond to restricted information. In various embodiments of the invention, such rules may be defined by an automated evaluation of the values of a given field. For example, if a field called "foo" only contains the values "HIV positive" and "HIV negative", then the field may be automatically identified as corresponding to restricted information, even though the tag name "foo" cannot be mapped to a pre-specified normative tag. In various embodiments of the invention, the information security rules may specify that a tag may be confidential by itself, or that a combination of tags may be confidential when they appear together.

At step 602, data fields that need to be kept together for processing are identified based on the above rules. For example, if the rent per square feet needs to be computed, then the fields that relate to the total rent and total area (in square feet) need to be kept together. Such combinations of data fields are treated as a single entity. At step 604, combinations of fields that collectively correspond to restricted information are identified based on the above rules. At step 606, one or more data fields that individually correspond to restricted information are identified based on the above rules. Subsequently, at step 608, a maximal subset of fields that can be safely transferred to a minimally secure entity is determined so that (i) fields, according to step 606, do not occur, (ii) fields, according to step 602, are kept together, and (iii) at least one field in field sets, according to step 604, is not present. This is the maximal subset set of fields that can be outsourced for processing. In an embodiment of the invention, a weight can be assigned to each data field (e.g., based on the amount of labor needed to process each field. In this case, the maximal subset of fields represents the fields that are the most labor-intensive to process.) In various embodiments of the invention, a weight can be assigned on the basis of the time involved in processing each field, the cost involved in processing each field, the outsourcing risk involved in processing each field, and so forth. The calculation of the maximal set as described above is a standard constraint optimization problem, which can be solved by any appropriate optimization algorithm.

Figure 7:
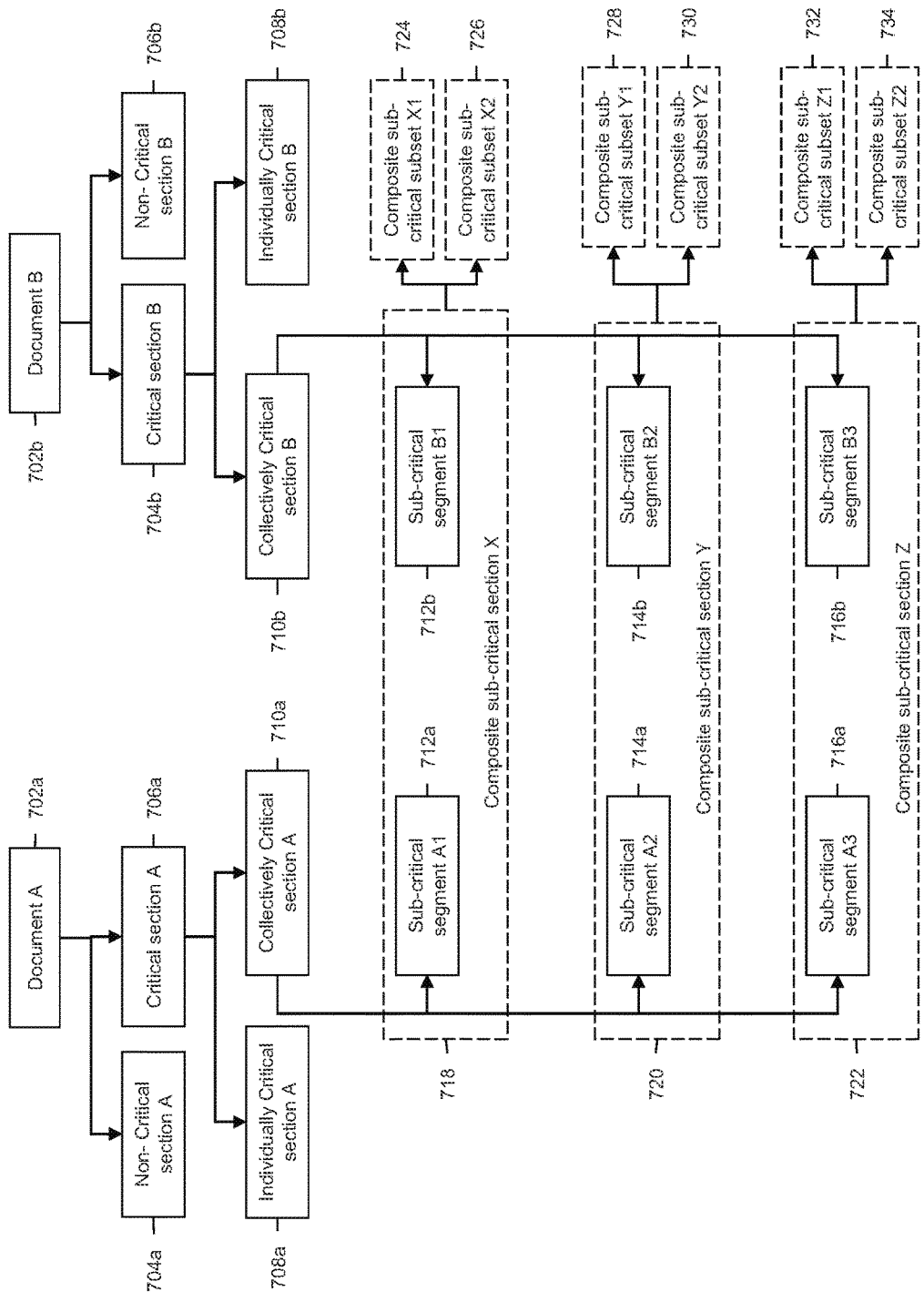
FIG. 7 is a block diagram illustrating the division of one or more documents, in accordance with an embodiment of the present invention.

FIG. 7 is a block diagram illustrating the division of one or more documents, in accordance with an embodiment of the present invention. According to various embodiments of the present invention, a document A 702*a* may be divided into a non-critical section 704*a* and a critical section 706*a*. The critical section 704*a* may be further divided into an individually critical section 708*a* and a collectively critical section 710*a*. The collectively critical section 710*a* may be segmented into a sub-critical segment A1 712*a*, a sub-critical segment A2 714*a* and a sub-critical segment A3 716*a*.

Similarly, a document B 702*b* may be divided into a non-critical section 704*b* and a critical section 706*b*. The critical section 704*b* may be further divided into an individually critical section 708*b* and a collectively critical section 710*b*. The collectively critical section 710*b* may be segmented into a sub-critical segment A1 712b, a sub-critical segment A2 714b and a sub-critical segment A3 716b.

The sub-critical segments from document A 702a and document B 702b may be recombined to give composite sub-critical subsets. For example, sub-critical segment A1 712a may be recombined with sub-critical segment B1 712b to form a composite sub-critical section X 718. Similarly, sub-critical segment A2 714a may be recombined with sub-critical segment B2 714b to form a composite sub-critical section Y 720 and sub-critical segment A3 716a may be recombined with sub-critical segment B3 716b to form a composite sub-critical section Z 722. The composite sub-critical sections may be divided into one or more subsets. For example, composite sub-critical section X 718 is divided into a composite sub-critical subset X1 724 and a composite sub-critical subset X2 726. Similarly other composite sub-critical sections may be divided into further subsets.

According to various embodiments of the invention, the non-critical sections of documents may also be segmented into non-critical segments in the same manner as the collectively critical sections are segmented into sub-critical segments. The non-critical segments of different documents may be recombined to produce composite non-critical sections.

In certain circumstances, it may be desirable to store portions of the documents containing restricted information in one or more minimally secure locations. In an embodiment, each document is split into sections where each section is critical, non-critical, or sub-critical. The critical subsections are stored in one or more secure locations. The non-critical and sub-critical subsections are stored at one or more minimally secure locations.

In a secure location, a matching key is stored to access the data which is stored at a minimally secure location. Each record stored at the secure location would contain the data from the critical sections, as well as a key in place of each sub-critical section.

An example is provided below. In this example, there are three records, each with Social Security #, Address, Name and Credit Card (broken into a Type, First Half and Second Half). Social Security # is an individually critical section, while Address, Name, Credit Card First Half, and Credit Card Second Half are each sub-critical. Certain combinations of these sub-critical sections, when combined, would be considered critical. The critical section Social Security # is stored at a secure location, along with keys to the other sub-critical sections. The data from the sub-critical sections is stored at minimally secure locations 1-4, along with the corresponding keys. In this way, the entire record can be reassembled at the secure location, using the keys. The splitting can potentially be done with fewer locations, depending on the regulatory context, but this is just an example.

| Stored at Secure Location | | | | |
|---|---|---|---|---|
| Address Key | Name Key | Credit Card First Half Key | Credit Card Second Half Key | Social Security # |
| A7 | B1 | C55 | D5 | 111-22-3333 |
| A11 | B2 | C92 | D9 | 999-99-9999 |
| A9 | B3 | C23 | D88 | 123-45-6789 |

-continued

| Stored at Minimally Secure Location 1 | |
|---|---|
| Address Key | Address |
| A7 | 123 Example St |
| A9 | 456 Patent Rd |
| A11 | 789 Island Blvd |

| Stored at Minimally Secure Location 2 | |
|---|---|
| Name Key | Name |
| B1 | John Smith |
| B2 | Jane Doe |
| B3 | Mary Jones |

| Stored at Minimally Secure Location 3 | | |
|---|---|---|
| Credit Card First Half Key | Credit Card Type | Credit Card First Half |
| C23 | Visa | 0000-1111 |
| C55 | Visa | 1234-5678 |
| C92 | MasterCard | 9999-9999 |

| Stored at Minimally Secure Location 4 | |
|---|---|
| Credit Card Second Half Key | Credit Card Second Half |
| D5 | 2222-2222 |
| D9 | 3333-3333 |
| D88 | 9999-8888 |

An attacker who has gained access to any one of the minimally secure locations has not viewed critical information. This is also true for an attacker viewing more than one minimally secure location, provided he does not view the key mappings in the secure location (as discussed in the shuffling embodiment below).

The data in the secure location can also be stored in an alternate format using multiple tables. In this format, one table contains only matching keys, and there is another table for each critical subsection. If there are no critical subsections, this format is the same as the previously described format.

If one of the insecure locations becomes compromised, it is desirable to clear the compromised keys from the secure location. This ensures that if the attacker later gains access to the secure location, he is still unable to combine the data from the two locations.

One method for updating the keys is to randomly generate a mapping from the old keyset to a new keyset. The keys for the compromised location are updated on the secure server immediately upon notification of an attack. When the attack has ceased, the key mapping can be applied to the data stored in the minimally secure location.

Another method for updating the keys is simply to encrypt each key with a secret password. Alternatively, the key could be concatenated with the password and then the combination cryptographically hashed. This has the added benefit of being irreversible. An adversary who somehow acquired the new keyset as well as the password could not determine the old keyset. Upon notification of an attack, the password would be generated, and the secure location would update the relevant keys. The location under attack would be updated after the attack concluded.

Additionally, each keyset may be updated periodically without suspicion of an attack. This could occur daily, monthly, or on any fixed or non-fixed schedule. This would limit the risk in the possibility of an undetected attack. The attacker would need to view the data at a minimally secure location without being detected, and then access the key mapping stored at the secure location before the next key update.

Additionally, cryptographic hashes of the sub-critical data may be stored. After each attack, or on any schedule, the data stored at that minimally secure location could be hashed and compared to the stored hash. This prevents an adversary from secretly modifying the data during an attack. Because the data is not recoverable from the stored hash, it need not be stored at a location that is secure against unauthorized viewing. However, it should be stored in a location that is secure against modification. It preferably is stored at a location separate from where the sub-critical data is stored. While the burden of storing a hash can be several times the burden of storing a matching key, it will still be significantly smaller than the actual data itself.

In the cases where a field is possibly critical, as discussed above, the data structure can be slightly modified. When the actual data is not critical, the table in the secure location would contain a matching key as specified above. If the data is critical, it can be placed into the secure location table directly instead of using a matching key. An extra bit of information can be stored to indicate whether the stored data is a key or is actual data. This has the advantage of only utilizing the more expensive secure storage when necessary.

If none of the subsections of the data are individually critical, an alternate storage scheme may be used. This scheme can also be used if the individually critical sections are also split into sub-critical subsections as described elsewhere in this document. This scheme does not require any secure storage locations. Each minimally secure location stores the data from one sub-critical section as well as the matching key for that data. During an attack, the keys are updated at each location which is not under attack. While the data under attack is not accessible during the attack, all of the remaining data can be accessed because the keys are stored redundantly in every location. Hashes of the data in a given subsection, if desired, can be stored at any or all other locations to enable the confirmation of the accuracy of stored data in the locations under attack before such data again becomes accessible.

An example is given below. In this example, the non-critical/sub-critical sections are Name, Address and Blood Type. The Key determines which Name, Address and Blood Type correspond to each other.

| Stored at Minimally Secure Location 1 | |
|---|---|
| Key | Name |
| 5248643 | Jim Jones |
| 2414354 | Betty Williams |
| 3185464 | Carl Smith |

| Stored at Minimally Secure Location 2 | |
|---|---|
| Key | Address |
| 5248643 | 123 A Street |
| 2414354 | 456 B Street |
| 3185464 | 789 C Street |

| Stored at Minimally Secure Location 3 | |
|---|---|
| Key | Blood Type |
| 5248643 | A+ |
| 2414354 | O+ |
| 3185464 | AB− |

Regulations and other information security rules may be specific to the country/state/location of origin, storage, processing and/or access of the data. In one embodiment, subset criticality and sub-criticality are determined automatically based on the regulations concerning the data origin and storage locations. When a user tries to access the data, their location may be determined by methods such as IP address lookup, although this may be vulnerable to proxy attacks. Alternately, if the user trying to access the data has authenticated credentials with the system, the location may be retrieved from a secure credentials table.

If the data is accessed or processed from a location differing from the origin and storage locations, additional restrictions may apply. In this case, the user may not be permitted to view portions of the data stored in the minimally secure locations because the sub-critical sections were identified only based on the relevant regulations and rules of the locations of data origin and storage. In such situations, the software can automatically recalculate the maximum information that can be shared with the accessing user after considering all of the various rules and regulations specific to the locations from where the data originated, was stored and was accessed. If the user can be authenticated, the user may wish to choose a different subset than the maximal subset. A list of allowable subsets can be presented for the user to choose from. In one embodiment, the user would not be permitted to change his choice after choosing which allowable subset they decide to view, as that might allow the possibility of accidental disclosure of a critical subset. The software may also track which data various users have accessed, also to prevent a user from accessing sub-critical data at different times, which could then be assembled into critical data.

More generally, the relevant information security rules may be determined based on a set of relevant jurisdictions. These jurisdictions may be at any level: city, state, country, region (e.g., EU), etc. The relevant jurisdictions may be determined by many factors: where the data is originated, stored, processed or accessed; or the citizenships, residence or nationalities of individuals who are originating, storing, processing or accessing the data. As new jurisdictions become relevant, the information security rules may be updated to account for this.

The split data storage schemes described above can be implemented via a standard database access protocol such as SQL. For example, a program may invoke a standard SQL data access query which would be intercepted by a modified data access module. This module would consider the specific data being requested by the query and the location from which the data access request originated. Then, based on this information, it would figure out the maximal or optimal portion of the requested information that could be served to the requestor, access various secure and minimally secure locations and return the maximal/optimal amount of data corresponding to the original request. Any information requested in the query that could not be served based on the request location and the relevant regulations and information security rules, would simply be blank or marked as restricted.

In certain circumstances, it may be desirable to process or store all parts of the original document at the same minimally secure location. In an alternate embodiment, each document is split into subsections where each subsection is non-critical or sub-critical. Then the subsections from a set of original documents are "shuffled" together to create a set of synthesized documents where no synthesized document contains critical combinations of subsections. In a simplistic implementation of this algorithm, each synthesized document could contain no more than one non-critical or sub-critical subsection from a given original document. Alternate implementations would allow more than one non-critical or sub-critical subsection from a given original document to be included in a synthesized document, so long as the combination of subsections is not critical.

In one embodiment, D documents containing restricted information could be shuffled into C synthesized documents where C=D. The synthesized documents have the same structure or format as the documents containing restricted information, but each collectively critical field or subpart of an individually critical field contains data from a different original document. For example, if D=100, synthesized document #7 might contain the Patient Name from original document #3 and the Address from original document #84 (assuming that Patient Name is non-critical, Address is non-critical, but the combination of Patient Name and Address is critical). The data in non-critical fields may be mapped directly across from original document X to synthesized document X or they may also be shuffled. Additionally fields that need to be kept together for processing could be included in the same synthesized document.

The data may still be processed in the shuffled format. For example, if the original data was a graphical image of a loan application, the shuffler could cut and paste subsets of the documents into synthesized documents. The data processor would still be able to type the characters shown on his screen, but his results would then be unshuffled after processing.

For each collectively critical field set consisting of N fields, an adversary might attempt to recombine the shuffled fragments into potentially critical information and then somehow check whether the combined information is critical. Each potential combination would have a 1-in-$D^N$ chance of being genuine sensitive information. For a set of D=100 documents, a set of three collectively critical fields would have a 0.0001% chance (one in one million) of being successfully recombined by the adversary. In other words, the adversary would have to check a million recombined potentially critical information before finding an actual case of critical information.

Another way to do this is to shuffle D documents containing restricted information into C synthesized documents, where C is much larger than D. C might be 100 times as large as D. In order to do this, additional data is generated. It should be extremely difficult for an adversary to distinguish between original data and generated data, or else he could simply filter out the generated data. One way to generate data would be to draw from a large list of genuine data, for example using a phone book to generate last names. For fields where the shape of the data is strictly defined, such as a social security number which is always a nine-digit number, the data could be randomly generated. In this approach, it is important not to reuse generated data, or else an adversary might observe several transmissions and deduce the set of generated data. It is also important not to draw from other documents containing restricted information.

If an adversary attempts to deduce restricted information, each potential recombination of an N-field collectively critical set has a 1-in-$C^N$ chance of corresponding to restricted information. For a set of D=100 documents, with C=(100*D), the chance of accurately recombining even a 2-field sensitive set is 1-in-100-million.

The mapping from documents containing restricted information to synthesized documents can be described as a "shuffle key." This shuffle key would ideally be generated randomly and not re-used, for maximum security. The minimally secure facility would have access to the shuffled synthesized documents but preferably would not have access to the shuffle key.

In these schemes the data can be un-shuffled into the original D documents or more likely the corresponding D output documents if the shuffle key is known. One way to describe the shuffle key would be to give, for each shuffled field in each of the D documents, the index of the synthesized document that the data ended up in. Therefore if there are D sensitive documents, F shuffled fields, and C synthesized documents, then the shuffle key would contain D*F*lg(C) bits of information. For example, if D is 100, F is 10, and C is 10000, then the shuffle key would contain roughly 13000 bits of information; a roughly 2 kB file.

It is also possible to describe the de-shuffling procedure using a much smaller shuffle key. A selected shuffle key of any length can be used as the seed for a known random number generator. This random number generator can then be used to shuffle the data into the C synthesized documents. The shuffle key should be from a shuffle key space larger than $C^N$ (where N is the size of the largest sensitive field-set) in order to avoid decreasing the security of the data. It should be noted that it would be difficult for an adversary to attempt to discover the shuffle key via brute-force methods. Any potential shuffle key the adversary tries would transform the data into some set of D documents, and it would be very difficult to know if genuine sensitive data has been recovered without extremely labor intensive testing of whether each potential combination corresponded to critical information.

If the data were merely being transported via an unsecure channel, traditional encryption techniques would suffice. This technique is valuable when the data must be processed along the way. Typically, the client would retain the shuffle key while sending the shuffled data to a processing provider, who would return shuffled processed data. The client could then unshuffle the data using the client shuffle key at a secure location.

Alternately, it may be desired to transmit data from one location to another, requiring processing along the way. If the processing operators, or other agents who may see the data in transit, cannot be trusted, then this technique can be used. The shuffle key can be provided to the receiver in plaintext via a separate channel. Alternately, the shuffle key can be encrypted using any public-key encryption scheme and transmitted securely to the receiver. In an extreme case, the shuffle key might be secured using one-time-pads. In each of these cases, the data can still be processed along the way without risking critical information and the final recipient receives the processed data and can unshuffle it at a secure location.

It is also possible for the synthesized documents to be in a different format from the documents containing restricted information. For example, all the data from all D documents could be combined into one large synthesized document, in an unknown order. This would result in a significantly larger shuffle key, but also a higher protection against adversaries. This method would be advantageous if the non-sensitive data in the documents resembled the sensitive data, in effect, gaining the benefits of adding generated data without the cost of generating that data or the overhead of transmitting unused bytes.

While many of the above examples are in the context of fields, the same methodologies can also be applied to parts of fields. For example, the SSN field may be individually critical, but the SSN may be split into three parts, each of which is sub-critical by itself. In cases where parts of the individually critical fields are always the same in a given context (for example, if all the SSNs are from the same city and thus a portion of every SSN is identical) then the variable portion of the individually critical field preferably would be split.

An SSN could possibly also be split into 9 parts. This would work especially well if the data for those 9 parts were shuffled across those 9 fields as well as across the C documents.

These data shuffling techniques, whether shuffling sub-critical fields of a collectively critical section, shuffling sub-critical parts of an individually critical field, or a combination, can also be used in other applications. For example, consider a case where the goal is the analysis of the error rates in a process, for example as described in U.S. Pat. No. 7,720,822, which is incorporated herein by reference. Consider a set of data entry operators who type the data from loan applications into a computer system. An audit can be performed on the operators by having each of them process the same set of documents. This data would then be provided by the client to an analyst. However, the analyst may not have permission to view restricted information.

In order to allow the analyst to compare the same fields of each document processed by different operators without gaining access to restricted information, we can shuffle the data in a repeatable way. Each of O operators creates a set of D processed documents, starting from the same original documents. We shuffle in a consistent repeatable way the sets of D processed documents containing restricted information to create sets of C synthesized documents. The sets of C synthesized documents can then be reviewed by the analyst, without exposing restricted information.

The analyst can then analyze the processed data from the sets of C synthesized documents. Because each set of C documents (one set for each operator) is shuffled the same way, field F in document K should contain the same value for each set of documents processed by a different operator. If the sets from different operators disagree, we can use various quality management analysis techniques to determine the correct answer. In this example, the data is shuffled only across documents, not across fields, so that if errors in different fields have different weights, the weight of each error is known without distortion. If multiple fields have the same error weight, such as subparts of SSN as described above, there is also an option to shuffle data between equally weighted fields as well.

This system can also be used to add generated artificial data which intentionally contains a known number of errors. This can prevent an adversary from separating live data from generated data on the basis of error rate.

If artificial data is to be added, in one approach, the same generated data is added to the document sets for each of the operators. The artificial data is not processed by the operators, merely added to the set of processed documents in a consistent manner. The artificial data would be consistent across operators and would thus contain no variance and thus no errors (unless errors were deliberately inserted, for example to confound an adversary). The analysis will thus return a consistently diluted error rate. For example, if C=100*D, then the weighted rate of errors in D can be calculated by multiplying the reported weighted error rate in C by 100. If the artificial data intentionally included errors, that error rate would be subtracted from the reported error rate before multiplying by the scaling factor. Given that only the client knows what proportion of the documents were artificial data, this method has the additional benefit that even the analyst does not become aware of the true error rate of the process and only the client would be aware of this information. An adversary who performs a similar "shuffled analysis" also would not be able to deduce the true error rate.

In the analyst audit scenario, the data is not processed into a document of the same form as the original data. Sets of synthesized documents are provided to the analyst who prepares a report. Therefore, a different un-shuffling procedure is used in this case. Information about the error rate by field or by operator will be accurate (once adjusted by the proportion of artificial added data), but descriptions of individual errors will be difficult or impossible to tag with the appropriate location id from the original sets of D documents to enable manual confirmation or context checks for the errors. Instead, the analyst can describe errors by which location in the synthesized documents the error appears in, and the shuffle key can be used to look up the appropriate location in the original data. If the error details are provided in a structured form, this remapping of error details can also be conducted automatically. For example, the analyst's report may say a given error occurred in field F1 in document C3 processed by operator O5. The shuffle key would tell us that field F1 in document C3 really corresponds to field F1 in document D6 and the remapped error log would thus say that the error actually occurred in field F1 of document D6.

Additionally, the client can use this system to cryptographically hash or otherwise deterministically encrypt the data before shuffling. This would significantly reduce the risk of the analyst gaining access to restricted information. Unfortunately, this would also remove the ability of the analyst to analyze the errors at the character level to find patterns. The data preferably should be converted to a "normalized" or "conformant" form before being encrypted, or else equivalent entries may hash to different hashes. For example, names should be rendered entirely in upper case.

In another embodiment, the data is not shuffled after being encrypted. This allows certain patterns, such as the data from two fields being consistently swapped, to remain discoverable by the analyst.

In order to prevent against rainbow table, brute force, and statistical analysis attacks, the data can be salted according to the shuffle key of the document it occurs in, and/or using a random seed for the entire process. It may also be salted by field, though this removes the ability to detect swapped field entries. Alternately, the hashed output for a blank field can be provided to the analyst, to enable the analyst to detect patterns related to fields left blank.

The approaches described above can be used for many applications where multiples analogous sets of documents are to be compared.

The embodiments of the present invention have the advantage that they provide a method for processing documents containing restricted information.

Various embodiments of the present invention also provide a method for protecting restricted information in a document, while processing the document at a minimally secure location.

Various embodiments of the present invention allow the maximization of the subset of a document that can be processed at a less-secure location or by using a less secure resource. The maximization technique (described in conjunction with FIG. 6) optionally takes into consideration the relative weights for each field. For example, the maximal subset of fields can represent the subset of the document that is the most labor-intensive to process, thereby enabling maximal processing at a low-cost, low-security location, without risking the confidentiality of restricted information.

Various embodiments of the present invention allow software systems to incorporate and automatically enforce the information-sharing restrictions specified by competent authorities, thereby simplifying compliance with such regulations.

The embodiments of the present invention further enable the protection of restricted information, even if encryption and access restriction systems fail and a malicious third party gains access to the documents.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit, and the Internet. The computer comprises a microprocessor. The microprocessor can be one or more general- or special-purpose processors such as a Pentium®, Centrino®, Power PC®, and a digital signal processor. The microprocessor is connected to a communication bus. The computer also includes a memory, which may include Random Access Memory (RAM) and Read Only Memory (ROM). The computer system also comprises a storage device, which can be a hard disk drive or a removable storage device such as a floppy disk drive, an optical disk drive, and so forth. The storage device can also be other similar means for loading computer programs or other instructions into the computer system. The computer system also includes one or more user input devices such as a mouse and a keyboard, and one or more output devices such as a display unit and speakers.

The computer system includes an operating system (OS) such as Windows, Windows CE, Mac, Linux, Unix, a cellular phone OS, or a proprietary OS.

The computer system executes a set of instructions that are stored in one or more storage elements, to process input data. The storage elements may also hold data or other information, as required. A storage element may be an information source or physical memory element present in the processing machine.

The set of instructions may include various commands that instruct the processing machine to perform specific tasks, such as the steps constituting the method of the present invention. The set of instructions may be in the form of a software program. The software may be in various forms, such as system software or application software. Further, the software may be in the form of a collection of separate programs, a program module with a larger program, or a portion of a program module. The software might also include modular programming in the form of object-oriented programming, and may use any suitable language such as C, C++ and Java. The processing of input data by the processing machine may be in response to user commands to results of previous processing or to a request made by another processing machine.

While the preferred embodiments of the invention have been illustrated and described, it will be clear that it is not limited to these embodiments only. Numerous modifications, changes, variations, substitutions and equivalents will be apparent to those skilled in the art, without departing from the spirit and scope of the invention, as described in the claims.

We claim:

1. A computer-implemented method for securely storing one or more documents, the documents containing restricted information, the restricted information not to be disclosed at a minimally secure location, the method comprising software executing on a hardware computer system to execute the steps of:

segmenting fields in the documents into critical sections, sub-critical sections, and non-critical sections; each critical section containing data that is defined by information security rules as individually corresponding to restricted information, each sub-critical section containing data that is defined by information security rules as individually not corresponding to restricted information but collectively with other sub-critical sections as corresponding to restricted information, and each non-critical section containing data that is defined by information security rules as not corresponding to restricted information; wherein segmenting the fields in the documents further depends on a frequency of occurrence of data contained in the fields;

effecting storage of the critical sections at secure location(s), the critical sections stored in a manner that associates critical sections with first keys;

effecting storage of the sub-critical and the non-critical sections at minimally secure location(s), said sections stored in a manner that associates said sections with second keys;

wherein the first and second keys form keysets that can be used to reassemble the sections of a document.

2. The method of claim 1 wherein the secure location(s) store the critical sections of a document and also store reference keys that reference those sub-critical and non-critical sections stored at minimally secure location(s).

3. The method of claim 2 wherein a minimally secure location stores the reference key for those sub-critical and non-critical sections stored at that minimally secure location.

4. The method of claim 1, further comprising:
changing the keyset, if a minimally secure location is compromised.

5. The method of claim 1, further comprising:
periodically changing the keyset.

6. The method of claim 1, further comprising:
using an encryption algorithm to change the keysets.

7. The method of claim 1, further comprising:
hashing the sub-critical and/or non-critical sections stored at a minimally secure location;
comparing said hashes to previous hashes of the sub-critical and/or non-critical sections, wherein the previous hashes are stored at a location different from the minimally secure location.

8. A system comprising a hardware computer that includes a non-transitory computer readable medium having computer program code embodied thereon for securely storing one or more documents, the documents containing restricted information, the restricted information not to be disclosed at a minimally secure location, the computer program code comprising:

a document-dividing module, for segmenting fields in the documents into critical sections, sub-critical sections, and non-critical sections; each critical section containing data that is defined by information security rules as individually corresponding to restricted information, each sub-critical section containing data that is defined by information security rules as individually not corresponding to restricted information but collectively with other sub-critical sections as corresponding to restricted information, and each non-critical section containing data that is defined by information security rules as not corresponding to restricted information;

wherein segmenting the fields in the documents further depends on a frequency of occurrence of data contained in the fields;

a storage module for effecting storage of the critical sections at secure location(s), the critical sections stored in a manner that associates critical sections with first keys;

the storage module further for effecting storage of the sub-critical and the non-critical sections at minimally secure location(s), said sections stored in a manner that associates said sections with second keys; and wherein the first and second keys form keysets that can be used to reassemble the sections of a document.

9. A computer program product for use with a computer, the computer program product comprising a non-transitory tangible computer readable medium having a computer program code embodied therein for securely storing one or more documents, the documents containing restricted information, the restricted information not to be disclosed at a minimally secure location, the computer program code performing the steps of:

segmenting fields in the documents into critical sections, sub-critical sections, and non-critical sections; each critical section containing data that is defined by information security rules as individually corresponding to restricted information, each sub-critical section containing data that is defined by information security rules as individually not corresponding to restricted information but collectively with other sub-critical sections as corresponding to restricted information, and each non-critical section containing data that is defined by information security rules as not corresponding to restricted information; wherein segmenting the fields in the documents further depends on a frequency of occurrence of data contained in the fields;

effecting storage of the critical sections at secure location(s), the critical sections stored in a manner that associates critical sections with first keys;

effecting storage of the sub-critical and the non-critical sections at minimally secure location(s), said sections stored in a manner that associates said sections with second keys;

wherein the first and second keys form keysets that can be used to reassemble the sections of a document.

10. The computer program product of claim 9 wherein the secure location(s) store the critical sections of a document and also store reference keys that reference those sub-critical and non-critical sections stored at minimally secure location(s).

11. The computer product of claim 10 wherein a minimally secure location stores the reference key for those sub-critical and/or non-critical sections stored at that minimally secure location.

12. The computer program product of claim 9, wherein the computer program code further performs the step of:
changing the keyset, if a minimally secure location is compromised.

13. The computer program product of claim 9, wherein the computer program code further performs the step of:
periodically changing the keyset.

14. The computer program product of claim 9, wherein the computer program code further performs the step of:
using an encryption algorithm to change the keysets.

15. The computer program product of claim 9, wherein the computer program code further performs the steps of:
hashing the sub-critical and/or non-critical sections stored at a minimally secure location;
comparing said hashes to previous hashes of the sub-critical and/or non-critical sections, wherein the previous hashes are stored at a location different from the minimally secure location.

* * * * *